Figure 1:
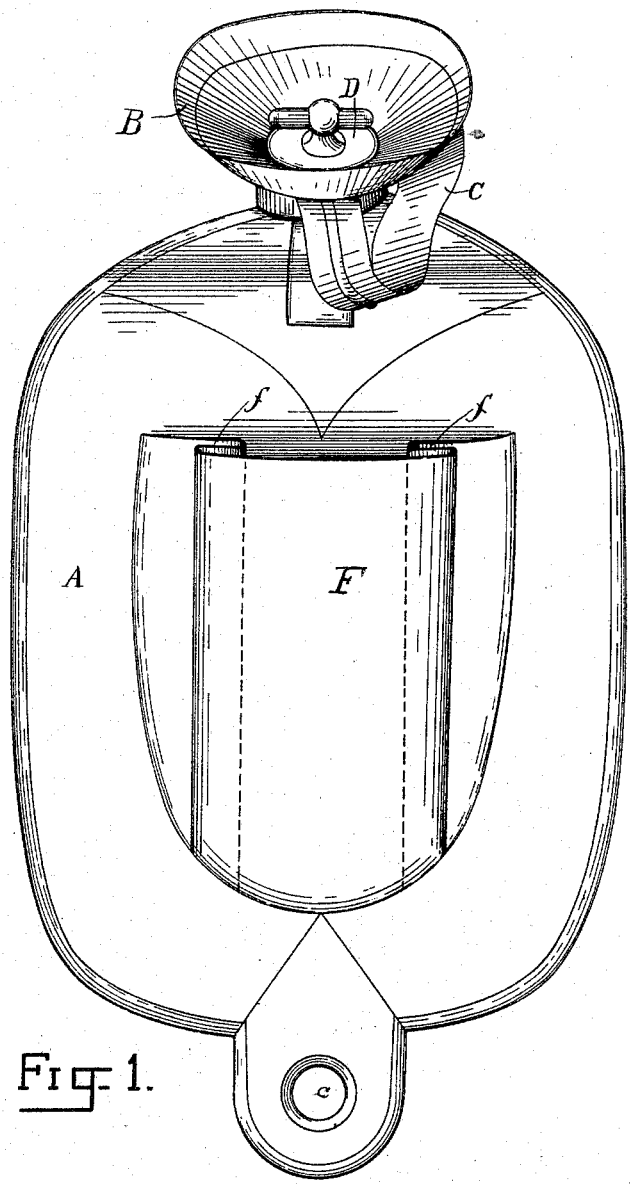

(No Model.)

A. M. PLUMMER.
WATER BAG AND FOOD WARMER.

No. 526,501. Patented Sept. 25, 1894.

WITNESSES:
Fred W. Hersey.
Emil W. Schmitz

INVENTOR:
Annie M. Plummer
By Charles H. Roberts
her attorney

UNITED STATES PATENT OFFICE.

ANNIE M. PLUMMER, OF GLENCOE, ILLINOIS.

WATER-BAG AND FOOD-WARMER.

SPECIFICATION forming part of Letters Patent No. 526,501, dated September 25, 1894.

Application filed November 28, 1892. Serial No. 453,317. (No model.)

*To all whom it may concern:*

Be it known that I, ANNIE M. PLUMMER, a citizen of the United States, residing at Glencoe, in the county of Cook and State of Illinois, have invented a new and useful Improved Water-Bag and Food-Warmer, of which the following is a specification.

My invention relates to hot water bottles and bags, and the objects of my improvement are, to utilize the temperature of the fluid placed in such bags in warming and cooling and maintaining the temperature of food, medicines and the like, and particularly to warm and maintain the warmth of food and similar articles for infants and invalids. To secure these objects I have invented an attachment for the water receptacle known in the trade as "hot-water bottle," "water bag," &c., which is simply a pocket attached preferably to the side of the bag, and intended to hold a bottle containing food or other preparations or to hold other articles.

Illustrations of my device are shown in the drawings, in which—

Figure 2:
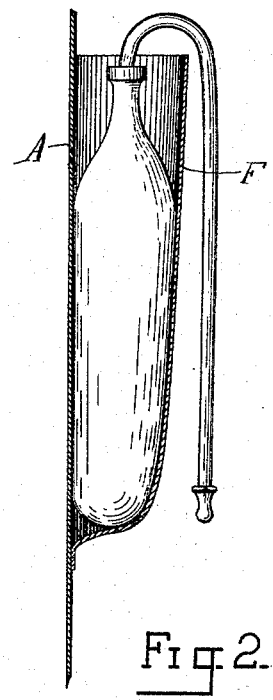
Figure 3:
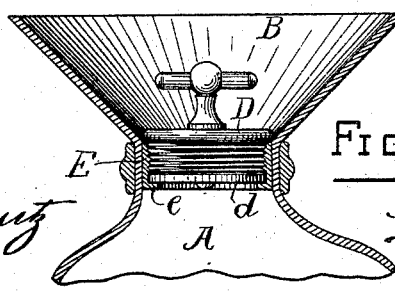

Figure 1 is a view of a water-bag with a pocket attached. Fig. 2 is a vertical section through the pocket showing the walls thereof inclosing a bottle. Fig. 3 is a section showing the mouth of the water-bag with stopper to retain the fluid within the bag.

Similar letters refer to similar parts throughout the several views.

As the ordinary water bag, when filled with hot water, retains heat for a long time, this device is very useful in warming and maintaining the warmth of food and similar articles for infants and invalids during the night, or in traveling; and, generally, whenever means of heating or maintaining a temperature of food, &c., may be inadequate or difficult to secure. Thus, by the use of this device, the nurse can utilize the same quantity of heated water in the water bag at will, either for applying externally by the use of the water bag in the usual way, or by giving internally the heated food or contents of the pocket.

The device will be found of advantage in maintaining a regular temperature in foods, &c., even when other means of heating are accessible.

In the drawings, A represents a rubber bag so constructed as to lie flat when empty. This bottle or bag is preferably supplied with an integral funnel B, and support strap C, and eyelet c, and has a threaded stopper D fitted with rubber sealing disk d, said stopper D screwing into a threaded bottle neck E having a sealing seat e against which the rubber disk is thrown by the action of screwing the stopper into the bottle thus sealing the same. F is the pocket, and *f f* the plaits thereof.

My device is preferably constructed of rubber, although any other suitable material may be used, and is preferably supplied with integral funnel and support strap, as shown in the drawings, but may be made without these attachments.

The pocket is attached at any point and in any convenient manner, but preferably on the side as shown in the drawings, and if the bag is made of rubber the pocket may be made integral therewith.

When empty and in a flat condition suitable for packing or transportation, the surplus material of the pocket is disposed in two overlapping vertical plaits, which allow the pocket to remain flat while erect, and also to open readily to receive the food bottle or other material.

It is evident that any other temperature may be secured and conserved by this means by the use of ice, &c., instead of hot water in the bottle to which the pocket is attached. Either the bottle itself or its pocket may be made of any suitable material and of any desired shape, and the pocket may be attached at any convenient point so that the temperature of the water bottle may be transferred to the contents of the pocket.

I do not claim the water bottle broadly, but
What I claim, and desire to secure by Letters Patent, is—

In a combined hot water bag and food warmer, the combination with a main water tight receptacle for hot water, of a pocket attached to the outside of said receptacle and adapted to receive the food to be warmed, substantially as described.

In testimony whereof I affix my signature in presence of two witnesses.

ANNIE M. PLUMMER.

Witnesses:
PORTER B. FITZGERALD,
LEONARD A. LANGE.